(12) United States Patent
Sims et al.

(10) Patent No.: US 8,015,110 B2
(45) Date of Patent: Sep. 6, 2011

(54) SYSTEM AND METHOD OF AGGREGATING MULTIPLE TRANSACTIONS OVER NETWORK-BASED ELECTRONIC PAYMENT TRANSACTION PROCESSING SYSTEM

(75) Inventors: Alan Sims, Carrollton, TX (US); Brian Rubarts, Plano, TX (US)

(73) Assignee: Heartland Payment Systems, Inc., Frisco, TX (US)

( * ) Notice: Subject to any disclaimer, the term of this patent is extended or adjusted under 35 U.S.C. 154(b) by 760 days.

(21) Appl. No.: 11/092,529

(22) Filed: Mar. 29, 2005

(65) Prior Publication Data

US 2005/0216404 A1 Sep. 29, 2005

Related U.S. Application Data

(60) Provisional application No. 60/557,240, filed on Mar. 29, 2004.

(51) Int. Cl.
*G06Q 40/00* (2006.01)
(52) U.S. Cl. .......................................................... 705/40
(58) Field of Classification Search .................. 705/400, 705/40
See application file for complete search history.

(56) References Cited

U.S. PATENT DOCUMENTS

| 7,225,249 | B1 * | 5/2007 | Barry et al. | 709/227 |
| 7,587,196 | B2 * | 9/2009 | Hansen | 455/406 |
| 2003/0126094 | A1 * | 7/2003 | Fisher et al. | 705/75 |
| 2004/0148252 | A1 * | 7/2004 | Fleishman | 705/39 |
| 2005/0027610 | A1 * | 2/2005 | Wharton | 705/26 |
| 2005/0097040 | A1 * | 5/2005 | Chen et al. | 705/40 |

OTHER PUBLICATIONS

Paradata System Inc. Appoints a New Chaiman of the Board; Business Editors/Hgh-Tech Writers. Business Wire; New York:Oct. 30, 2002.p. 1.*
MP3 e-commerce application by Yang, Dong, Concordia University(Canada), 2002, 63 pages; AAT MQ68489.*
Netscape adds security to Web credit card use; Windfield, Nick. InfoWorld. San Mateo: Jul. 24, 1995. vol. 17, Iss. 30; p. 8,1pgs.*

* cited by examiner

*Primary Examiner* — Hani Kazimi
*Assistant Examiner* — Hatem Ali
(74) *Attorney, Agent, or Firm* — Potomac Patent Group PLLC

(57) ABSTRACT

A system and method of aggregating multiple transactions over a network-based electronic payment transaction processing system is provided. The system includes a transport-aggregating clear-text Internet transaction (TACIT) server designed to allow conventional electronic payment transaction processing systems to work over networks which rely on the Internet Protocol, and to still support the fault-tolerance and load balancing. In one embodiment, the system aggregates multiple transmission control protocol sockets into a single socket to a back-end payment processing system in a single application. The transport-aggregating, cleartext Internet transaction (TACIT) server resides on an intermediate system that is positioned between the Internet endpoints and a payment transaction processing system (TPS).

5 Claims, 2 Drawing Sheets

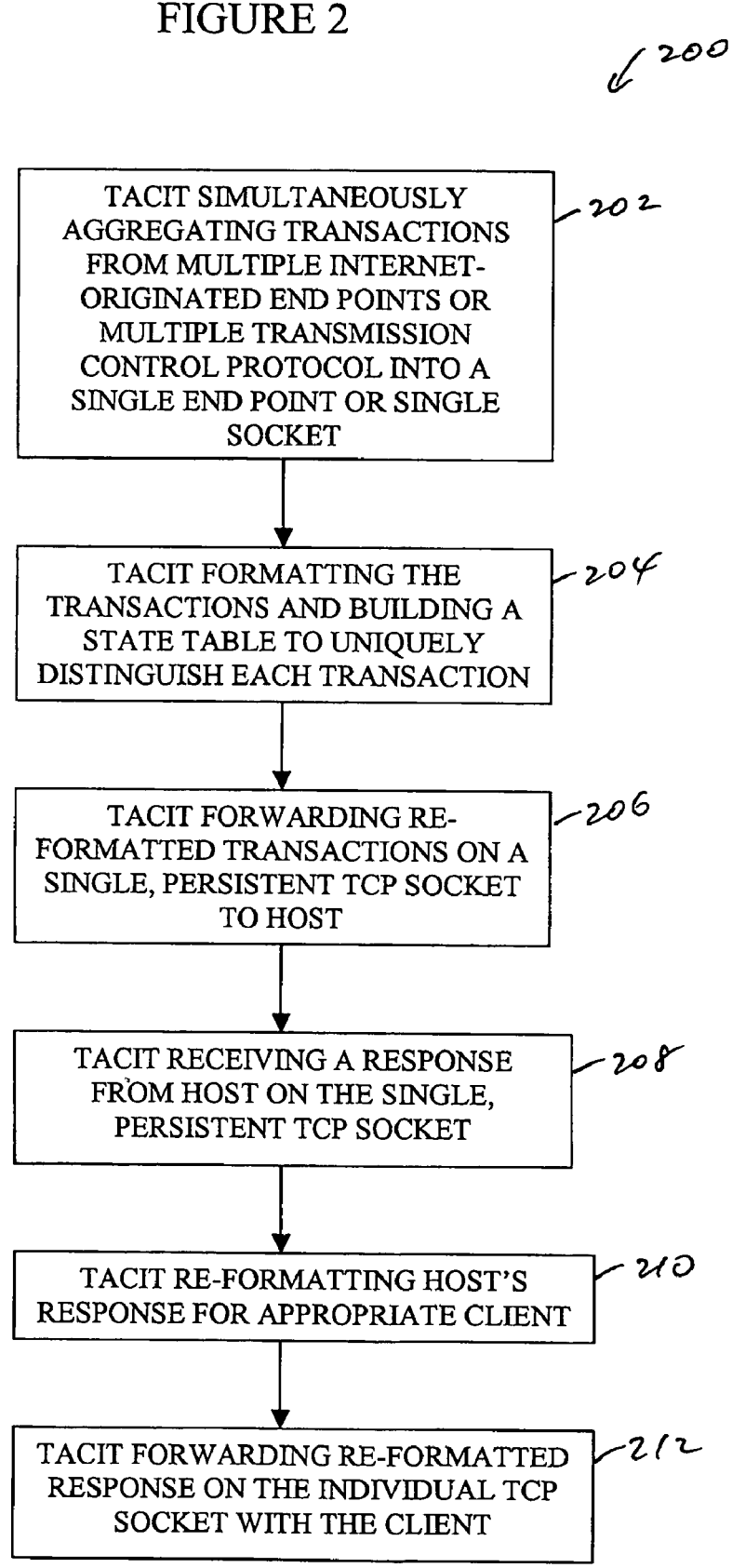

SYSTEM AND METHOD OF AGGREGATING MULTIPLE TRANSACTIONS OVER NETWORK-BASED ELECTRONIC PAYMENT TRANSACTION PROCESSING SYSTEM

CROSS-REFERENCE TO RELATED APPLICATION(S)

This application claims the benefit of U.S. Provisional application No. 60/557,240, entitled "SYSTEM AND METHOD OF AGGREGATING MULTIPLE TRANSACTIONS OVER NETWORK-BASED ELECTRONIC PAYMENT TRANSACTION PROCESSING SYSTEM", filed on Mar. 29, 2004, the subject matter of which is hereby incorporated by reference herein in its entirety.

FIELD OF THE INVENTION

The present invention relates generally to a network-based electronic payment transaction processing system and method, more particularly, to a system and method of servicing multiple transactions over a network-based electronic payment transaction processing system, and further more particularly, to a system and method of processing Internet-based credit and debit card transactions.

BACKGROUND OF THE INVENTION

The electronic payment processing industry has been in existence since the 1960s, and it has developed a set of protocols and processes unique to its own transaction requirements. The protocols were defined long before there was any consideration of using the Internet or its related protocols for commercial purposes. Because of the criticality of payment transactions, the overriding processing application design goal was the ability to monitor the system, and to ensure compliance with strict service level agreements (SLAs). Thus, the transaction systems use point-to-point communication methodologies, and they require the ability to maintain an always-on communication session.

The Internet uses a suite of protocols that work at various layers of the Transmission Control Protocol/Internet Protocol (TCP/IP) reference model. TCP is a session-oriented protocol that maintains state during application communication in order to guarantee once-and-only-once transmission of data. IP is a non-session-oriented protocol that provides a hierarchical address space for entities on diverse inter-connected networks to pass data to each other. In order to meet the functional requirements of legacy transaction processing systems while using an Internet Protocol-based network, the various applications used by financial entities required persistent TCP sockets—which are sessions between two endpoints that are defined by each of the peers' network and transport addresses—to be open at all times. Thus, the applications instruct TCP to create and permanently keep open a socket for information delivery between two endpoints.

The use of persistent TCP sockets provides for easy monitoring of the usability state of a communication session between two hosts. Unfortunately, persistent sockets also prevent the use of newly-developed availability and scalability measures. They also don't fit into the modern Electronic Commerce paradigm.

Electronic Commerce (e-commerce) is an information technology concept that has caught on with businesses en masse since the emergence of the commercial Internet and the World Wide Web. Because the original intended use of the World Wide Web was to share documentation and other text-based information seamlessly across a diversified and heterogeneous inter-network of computers, the protocol developed to support the web—the Hyper-Text Transport Protocol (HTTP)—had portability, point-to-multi-point operation, and speed of moving from one connection to the next as its major objectives. HTTP has become the foundation for all web sites, whether those sites are commercial, academic, or personal in nature. Following the four-layer TCP/IP communication model, HTTP is an Application Layer protocol. HTTP specifies that the transport—TCP socket—should be dynamically built and torn down for each application request.

Therefore, conventional electronic payment transaction processing systems fail to fit into the modern e-commerce paradigm, and they fail to support the technologies that make high-availability and scalability possible.

Accordingly, there is a need for a new generation of network-based electronic payment transaction processing system.

SUMMARY OF THE INVENTION

To solve the above and the other problems, the present invention provides a system and method of aggregating multiple transactions over a network-based electronic payment transaction processing system.

In one embodiment, the present invention provides a transport-aggregating clear-text Internet transaction (TACIT) server that is designed to allow conventional electronic payment transaction processing systems to work over networks which rely on the Internet Protocol, and to still support the fault-tolerance and load balancing architectures that modern e-commerce systems utilize with great success.

In one embodiment, the present invention provides a system and method of aggregating multiple transmission control protocol sockets into a single socket to a back-end payment processing system in a single application. A transport-aggregating, cleartext Internet transaction (TACIT) server resides on an intermediate system that is positioned between the public Internet (or similar transmission control protocol) and a transaction processing system (TPS).

In one embodiment, the TACIT server simultaneously aggregates transactions from multiple Internet-originated endpoints and forwards aggregated transactions serially across persistent TCP socket connection(s). This can be accomplished by inserting and removing application data into a communication stream from client systems to server systems, which builds a state table capable of uniquely distinguishing each client transaction on the back-end socket.

Further in one embodiment, the TACIT server provides denial-of-service (DoS) attack protection for the transaction processing systems (TPSs). This can be accomplished by inspecting the data contained in a header portion of each transaction's application data and validating the transaction before forwarding it to the back-end host.

Still in one embodiment, the TACIT server provides a framework in which message-translation can occur. This can be accomplished by reformatting any transaction that contains sufficient data to fill in all necessary fields in a message format that is used to communicate with the back-end transaction processing systems. This provides an acquirer with the ability to design its own message format for communicating with Internet-originating systems without compromising the communication methods with the associations such as Visa and MasterCard.

One of the advantages of the present invention is that because the TACIT server resides on an intermediate system between Internet-based point of sale (POS) systems and the processing system, the functions of performing DoS prevention and message translation add no memory or processing overhead to the transaction processing system.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 2 illustrates an exemplary flow process of a network-based electronic payment transaction processing method, in accordance with the principles of the present invention.

DETAILED DESCRIPTION OF THE PREFERRED EMBODIMENTS

Figure 1:
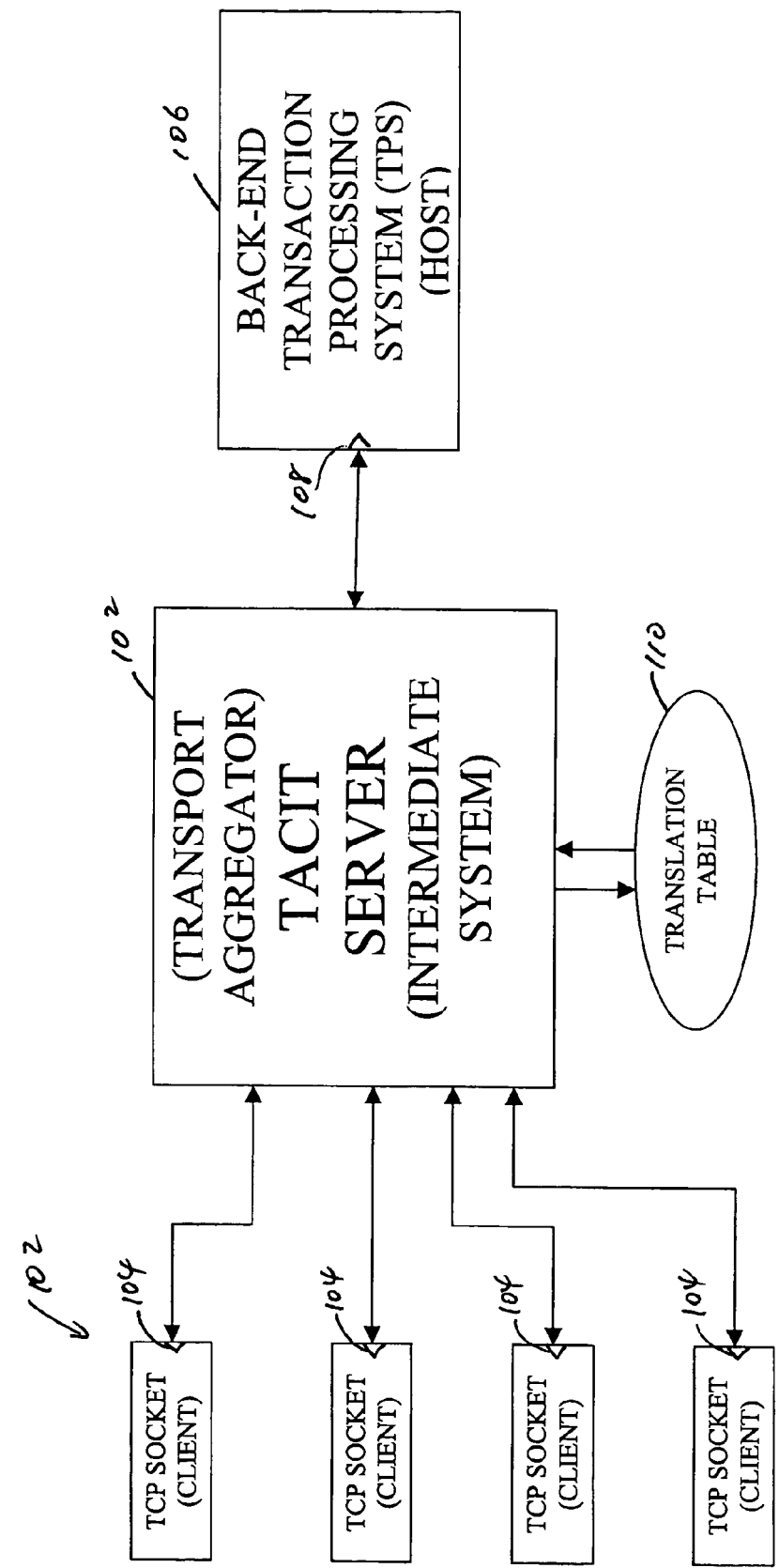
FIG. 1 illustrates one embodiment of a network-based electronic payment transaction processing system, in accordance with the principles of the present invention.

The present invention provides a system and method of aggregating multiple transactions over a network-based electronic payment transaction processing system as shown in FIG. 1. The system includes a transport-aggregating cleartext Internet transaction (TACIT) server designed to allow conventional electronic payment transaction processing systems (TPSs or host) to work over networks which rely on the Internet Protocol or similar transmission control protocols (TCPs at client systems or end points). The TACIT also supports fault-tolerance and load balancing architectures that are adapted to modern e-commerce systems.

As shown in FIG. 1, a TACIT server 100 resides on an intermediate system that is positioned between the public Internet 102 having a plurality of TCP end points or clients 104, and a transaction processing system (TPS) 106.

The TACIT server 100 simultaneously aggregates transactions from multiple Internet-originated endpoints 104 and forwards aggregated transactions serially across persistent TCP socket connection(s) or back-end socket 108. This may be accomplished by inserting and removing application data into a communication stream from client systems to TACIT server system, which builds a state table 110 capable of uniquely distinguishing each client transaction on the back-end socket 108.

The TACIT server 100 also provides denial-of-service (DoS) attack protection for the transaction processing systems (host systems) 106. This may be accomplished by inspecting the data contained in a header portion of each transaction's application data and validating the transaction before forwarding it to the back-end host systems 106.

Further, the TACIT server 100 provides a framework in which message-translation can occur. This may be accomplished by reformatting any transaction that contains sufficient data to fill in all necessary fields in a message format that is used to communicate with the back-end transaction processing systems 106. This provides an acquirer with the ability to design its own message format for communicating with Internet-originating systems 102 without compromising the communication methods with the associations such as Visa, or MasterCard, etc.

One of the advantages of the present invention is that functions of performing DoS prevention and message translation add no memory or processing overhead to the transaction processing system or host system 106.

FIG. 2 illustrates an exemplary flow process 200 of a network-based electronic payment transaction processing method, in accordance with the principles of the present invention. The process 200 starts with a step 202 of TACIT simultaneously aggregating transactions from multiple Internet-originated end points or multiple transaction control protocol into a single end point or single socket. Then, TACIT formats the transactions and builds a state table 110 uniquely distinguish each transaction in a step 204. Next, TACIT forwards re-formatted transactions on a single, persistent TCP socket to host in a step 206. TACIT then receives a response from host on the single, persistent TCP socket in a step 208. TACIT then re-formats host's response for appropriate client in a step 210. In the next step 212, TACIT forwards re-formatted response on the individual TCP socket at the client.

Accordingly, in order to process automated teller machines, debit card, credit card, or any other types of check card transactions, computer systems that participate in payment authorization associations have run applications that build and maintain persistent transmission control protocol (TCP) sockets between themselves and their payment processing peers. TCP is a connection-oriented (stateful) protocol that is a member of the TCP/IP suite of protocols. Because the protocol is stateful, it provides a communications context that can be monitored, and it provides basic protection against hijackers' attacks. Therefore, using persistent, or "always on", connections among computing peers is beneficial in the sensitive and mission-critical environment of electronic payment processing. It facilitates the ability of each of the peers to monitor the state of their connections to client systems or business partners. Specifically, a credit card acquirer that represents its merchant base to the Visa association of issuing banks is able to monitor its ability to send transactions from its merchants to Visa's computing systems as well as to make instantaneous transaction routing decisions based upon the state of these connections. The same principle holds true for any transaction networks, such as MasterCard, American Express, JCB, Discover, etc.

In general, the features, operations, and advantages of the present invention are described as follows:

System Operation

In one embodiment of the present invention, a TACIT server is provided in connection with TCP/IP Model's Transport and Application layers. One of the primary purposes of TACIT server is to aggregate multiple communication peers, and to present their transactions to an electronic payment processing system as if they were coming from a monolithic system rather than a diversified set of systems. This is handled at the Transport layer, and provides the first two letters of the acronym—Transport-Aggregating.

The TACIT server may also normalize different financial protocols into a single protocol that the main payment processing system can understand and use efficiently. The result of this is that a company's transaction processing system (TPS) may become agnostic as to whether its clients or business partners use the Visa Framed protocol—with or without parity—or the International Standards Organization's 8583 message format; and the processing overhead created by the various message formats and protocols is removed from the TPS, and it is instead distributed across a series of TACIT servers.

The Application layer functions of speaking disparate financial protocols using unencrypted data over an IP network account for the last three letters of the acronym—Clear-text Internet Transaction. When conducting transactions over the Internet (a specific and public IP network), it may be necessary for the TACIT server to be combined with a security service, such as the Secure Sockets Layer (SSL), to verify the integrity and privacy of each transaction. SSL guarantees that all data passed between two endpoints is encrypted, and that it is transmitted without being altered in any way. To process transactions using the Internet as the medium between a business partner and a host payment transaction processing system, the TACIT server and SSL are combined into a single solution that the host payment transaction processing system refers to as SecureExchange. It is noted that encryption and data integrity are beyond the scope of the present invention which is not discussed herewith.

The TCP/IP and OSI Reference Models and brief summaries of the purposes of each model layer are provided below:

TCP/IP Model

| Layer of Reference Model | Description of Data at Reference Model Layer |
|---|---|
| Application | Combines the OSI Model's Session, Presentation, and Application layer functions |
| Transport | Exactly matches the OSI Model's Transport functions |
| Network | Exactly matches the OSI Model's Network functions |
| Network Interface | Combines the OSI Model's Physical and Data Link layer functions |

OSI Model

| Layer of Reference Model | Description of Data at Reference Model Layer |
|---|---|
| Application | Information that is made available to a user of the system |
| Presentation | Information that the application uses to render data in a format that is appropriate for the end user and for any other applications that use the same data |
| Session | Information that the application uses to be aware of the state of its communication partners |
| Transport | Information used by the host system to determine which application should receive inbound data from a foreign host |
| Network | Hierarchical addressing for networks and hosts |
| Data Link | Frames electronic or optical on-off values into machine-readable information |
| Physical | Specifications for interface types, media types, cabling, wireless radio frequencies, etc. |

Accordingly, TACIT server(s) act(s) as an intermediate system that sits between clients or business partners' applications and company's electronic payment TPS. By acting as an intermediary, a TACIT server is able to aggregate transactions originating from disparate persistent or dynamically-created TCP sockets onto a single, persistent TCP socket to the TPS.

Process Flow
System Startup
1. TACIT establishes a TCP socket with a back-end payment TPS.
2. TACIT accepts TCP socket connections from multiple clients or business partners' TPS.
3. TACIT is ready for transactions from the business partners.

Transaction Process
1. TACIT accepts transactions from various clients or business partners' TPS on multiple sockets.
2. TACIT formats the transactions as needed for the back-end TPS.
3. TACIT forwards the re-formatted transactions on a single, persistent TCP socket to the host.
4. TACIT receives the response from the host on the persistent TCP socket.
5. TACIT re-formats the host's response for the appropriate client or business partner.
6. TACIT forwards the re-formatted response on the individual TCP socket with the business partner.
7. Transaction Complete Other Use of TACIT Server(s)

In addition to allowing multiple remote transaction peers to use a single, persistent socket and providing a platform to facilitate message format agnosticism by company payment systems' electronic payment TPS, a TACIT server provides a platform for many other enhancements and benefits as well.

It is appreciated that a TACIT server may build persistent TCP sockets to two or more different back-end TPSes. By doing so, a TACIT server can act as a focal point for company's clients or business partners, and it can provide load balancing across multiple back-end systems. Since the back-end system is the one that does the majority of IO and processor-intensive operations, having a single TACIT server distribute the load across multiple TPSes provides a greater transaction scale potential than an environment without a TACIT server.

In one embodiment, company's business partners are able to use dynamically-created TCP sockets to send transactions over whereby multiple TACIT servers can be clustered together, and the TACIT servers can jointly service a virtual Internet Protocol address. With each of the clustered TACIT servers having persistent TCP sockets to multiple back-end hosts, it significantly improves the scalability and stability of the system.

One of the advantages of the present invention is that it provides dynamically-created TCP sockets by installing a TACIT server on the network. In this case, transaction processing hosts have persistent TCP sockets whereby their transactions are spread across a fault-tolerant and highly scalable array of intermediaries.

It is appreciated that the above and other features, operations, and advantages of the present invention will become apparent to those skilled in the art. As it will be realized, the present invention is capable of modifications in various obvious aspects, all without departing from the spirit and scope of the present invention.

DEFINITIONS AND ACRONYMS

Application—For the purposes of this document, an application is a compiled set of machine-readable instructions that facilitate electronic business processes.

HTTP—Hyper-Text Transport Protocol. HTTP is the foundational protocol of the World Wide Web that supports the exchange of information and commerce using the Internet as a medium.

IP—Internet Protocol. This is the network-layer protocol that provides for addressing and deliverability of datagrams on the Internet and other "networks of networks".

SLA—Service Level Agreement. SLAs define the availability and performance of a system that maintained by one entity, but used by another.

Socket—A socket is a communication session between two endpoints that is defined by combining the IP address and TCP port number on each host. Session state is maintained SSL—Secure Sockets Layer. SSL is an Application Layer protocol on the TCP/IP reference model, and its purpose is to ensure the privacy and integrity of data between two endpoints. SSL relies on the Public Key Infrastructure (PKI) to seed security associations between communication partners.

TACIT—Transport-Aggregating Clear-text Internet Transaction. Company Payment Systems' TACIT servers are designed to allow legacy electronic payment transaction processing systems to work more effectively over newer IP-based networks.

TCP—Transmission Control Protocol. TCP is the session-oriented transport-layer protocol that provides for once-and-only-once delivery of information segments on an IP-based network by using sequence numbering and acknowledgements.

TPS—Transaction Processing System. This is the system that processes electronic payment (credit, debit, and gift cards, etc.) transactions.

What is claimed is:

1. A network-based electronic payment transaction processing system, comprising:
    two or more back-end electronic payment transaction processing host systems; and
    a transport-aggregating clear-text Internet transaction (TACIT) server, in communication between the back-end electronic payment transaction processing host systems and Internet end users, for simultaneously aggregating multiple payment transactions from the Internet end users and presenting an aggregated transaction over to any one of the back-end electronic payment transaction processing host systems by means of a respective one of a plurality of persistent back-end sockets, each of the persistent back-end sockets being associated with a respective one of the back-end electronic payment transaction processing host systems;
    wherein the TACIT server is configured to reformat any of the transactions to insert fields in a message format utilized to communicate with one or more of the back-end electronic payment transaction processing host systems, and
    wherein the back-end electronic payment transaction processing host systems together process the multiple payment transactions from the Internet end users with fault-tolerance and load balancing among the back-end electronic payment transaction processing host systems,
    wherein the transport-aggregating, clear text Internet transaction (TACIT) server inspects data contained in a header portion of application data of each transaction and validates the transaction before presenting it as part of the aggregated transmission control protocol transaction to the one of the persistent back-end sockets, and
    wherein the transport-aggregating clear-text Internet transaction (TACIT) server is further for building a state table that uniquely distinguishes each of the payment transactions from the Internet end users on the respective one of the one or more persistent back-end sockets.

2. A network-based electronic payment transaction processing system, comprising:
    two or more back-end transaction payment processing systems; and
    a transport-aggregating clear-text Internet transaction (TACIT) server, in communication between the back-end transaction payment processing systems and Internet end users, for simultaneously aggregating multiple transmission control protocol transactions from the Internet end users to form an aggregated transmission control protocol transaction and for presenting the aggregated transmission control protocol transaction to one of a plurality of persistent back-end sockets, each of the persistent back-end sockets being associated with a respective one of the back-end transaction payment processing systems,
    wherein the TACIT server is configured to reformat any of the transactions to insert fields in a message format utilized to communicate with the back-end transaction payment processing systems,
    wherein the transport-aggregating, cleartext Internet transaction (TACIT) server inspects data contained in a header portion of application data of each transaction and validates the transaction before presenting it as part of the aggregated transmission control protocol transaction to the one of the persistent back-end sockets, and
    wherein the transport-aggregating clear-text Internet transaction (TACIT) server is further for building a state table that uniquely distinguishes each of the transmission control protocol transactions from the Internet end users on the respective one of the one or more persistent back-end sockets.

3. The system of claim 2, wherein the transport-aggregating, clear text Internet transaction (TACIT) server resides on an intermediate system that is positioned between the Internet and the back-end transaction payment processing systems.

4. A non-transitory computer-readable medium comprising computer readable instructions which are provided for processing network-based electronic payment transactions wherein, when a processing arrangement executes the instructions, the processing arrangement is configured for:
    simultaneously aggregating transport layer protocol transactions from multiple Internet-originated endpoints;
    formatting the transport layer protocol transactions and building a state table that uniquely distinguishes each of the transport layer protocol transactions;
    reformatting any of the transport layer protocol transactions to insert fields in a message format utilized to communicate with one or more back-end payment transaction processing systems by means of a respective one of one or more persistent back-end sockets; and
    forwarding re-formatted transport layer protocol transactions on one of the persistent back-end sockets to one of the back-end payment transaction processing systems,
    wherein building the state table comprises uniquely distinguishing each of the transport layer protocol transactions on the respective one of the one or more persistent back-end sockets, and
    wherein, when the processing arrangement executes the instructions, the processing arrangement is further configured for:
    inspecting data contained in a header portion of application data of each transport layer protocol transaction and validating the transport layer protocol transaction before presenting it to the respective one of the one or more persistent back-end sockets.

5. The non-transitory computer-readable medium of claim 4, wherein, when the processing arrangement executes the instructions, the processing arrangement is further configured for:
    receiving a response from the one of the back-end payment transaction processing systems on the respective one of the one or more persistent back-end sockets;
    re-formatting the response for a corresponding endpoint; and
    forwarding a re-formatted response on a TCP socket in communication with the corresponding endpoint.

* * * * *